US009869475B2

(12) United States Patent
Farris et al.

(10) Patent No.: US 9,869,475 B2
(45) Date of Patent: Jan. 16, 2018

(54) HEAT PUMP WATER HEATER APPLIANCE AND A METHOD FOR OPERATING THE SAME

(71) Applicant: General Electric Company, Schenectady, NY (US)

(72) Inventors: Brett Alan Farris, Louisville, KY (US); Michael Lee Alsip, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 387 days.

(21) Appl. No.: 14/594,374

(22) Filed: Jan. 12, 2015

(65) Prior Publication Data
US 2016/0201929 A1 Jul. 14, 2016

(51) Int. Cl.
| F24D 19/10 | (2006.01) |
| F24D 19/08 | (2006.01) |
| F25D 21/14 | (2006.01) |
| F24D 15/04 | (2006.01) |

(52) U.S. Cl.
CPC ......... *F24D 19/1054* (2013.01); *F24D 15/04* (2013.01); *F24D 19/088* (2013.01); *F25D 21/14* (2013.01); *Y02B 30/12* (2013.01)

(58) Field of Classification Search
CPC .... F24D 19/088; F24D 19/1054; F24D 15/04; F25D 21/14; Y02B 30/12
See application file for complete search history.

(56) References Cited

U.S. PATENT DOCUMENTS

| 4,010,650 | A | * | 3/1977 | Piatkowski, Jr. | ..... G01F 23/263 |
| | | | | | 73/304 C |
| 4,362,994 | A | * | 12/1982 | Goldsmith | ............. G01N 27/07 |
| | | | | | 324/444 |
| 5,220,514 | A | * | 6/1993 | John | ..................... G01F 23/243 |
| | | | | | 324/690 |
| 5,220,807 | A | * | 6/1993 | Bourne | ................... F24D 17/02 |
| | | | | | 165/58 |
| 5,881,762 | A | | 3/1999 | Janesky | |
| 5,906,109 | A | * | 5/1999 | Dieckmann | ............... F24H 4/04 |
| | | | | | 237/2 B |
| 5,946,627 | A | | 9/1999 | Dieckmann et al. | |
| 6,274,850 | B1 | * | 8/2001 | Mercer | ............... A47J 37/1266 |
| | | | | | 219/441 |
| 8,319,626 | B1 | | 11/2012 | Cantolino | |
| 2008/0104974 | A1 | * | 5/2008 | Dieckmann | ............. F24F 3/153 |
| | | | | | 62/93 |

(Continued)

OTHER PUBLICATIONS

Water Research Center, "Drinking Water Testing and Conductivity of Water", http://www.waterresearch.net/index.php/drinkingwatertestingandconductivityofwater, 2014.*

*Primary Examiner* — Steven B McAllister
*Assistant Examiner* — Steven Anderson, II
(74) *Attorney, Agent, or Firm* — Dority & Manning, P.A.

(57) ABSTRACT

A heat pump water heater appliance includes a tank that defines an interior volume. A drain pan is positioned below an evaporator of a sealed system. A liquid monitoring sensor has a voltage divider with a pair of probes. The probes of the pair of probes extend into the drain pan. A related method for operating a heat pump water heater appliance is also provided.

20 Claims, 5 Drawing Sheets

(56) References Cited

U.S. PATENT DOCUMENTS

| | | | |
|---|---|---|---|
| 2009/0064698 A1* | 3/2009 | Spanger | F24F 13/222 62/280 |
| 2010/0206869 A1 | 8/2010 | Nelson et al. | |
| 2011/0214444 A1* | 9/2011 | Yoshii | F24H 4/04 62/160 |
| 2012/0222439 A1* | 9/2012 | Pena | F24F 11/0009 62/150 |
| 2013/0174830 A1 | 7/2013 | Neihouse et al. | |
| 2014/0102123 A1* | 4/2014 | Cantolino | F24F 13/222 62/150 |

\* cited by examiner

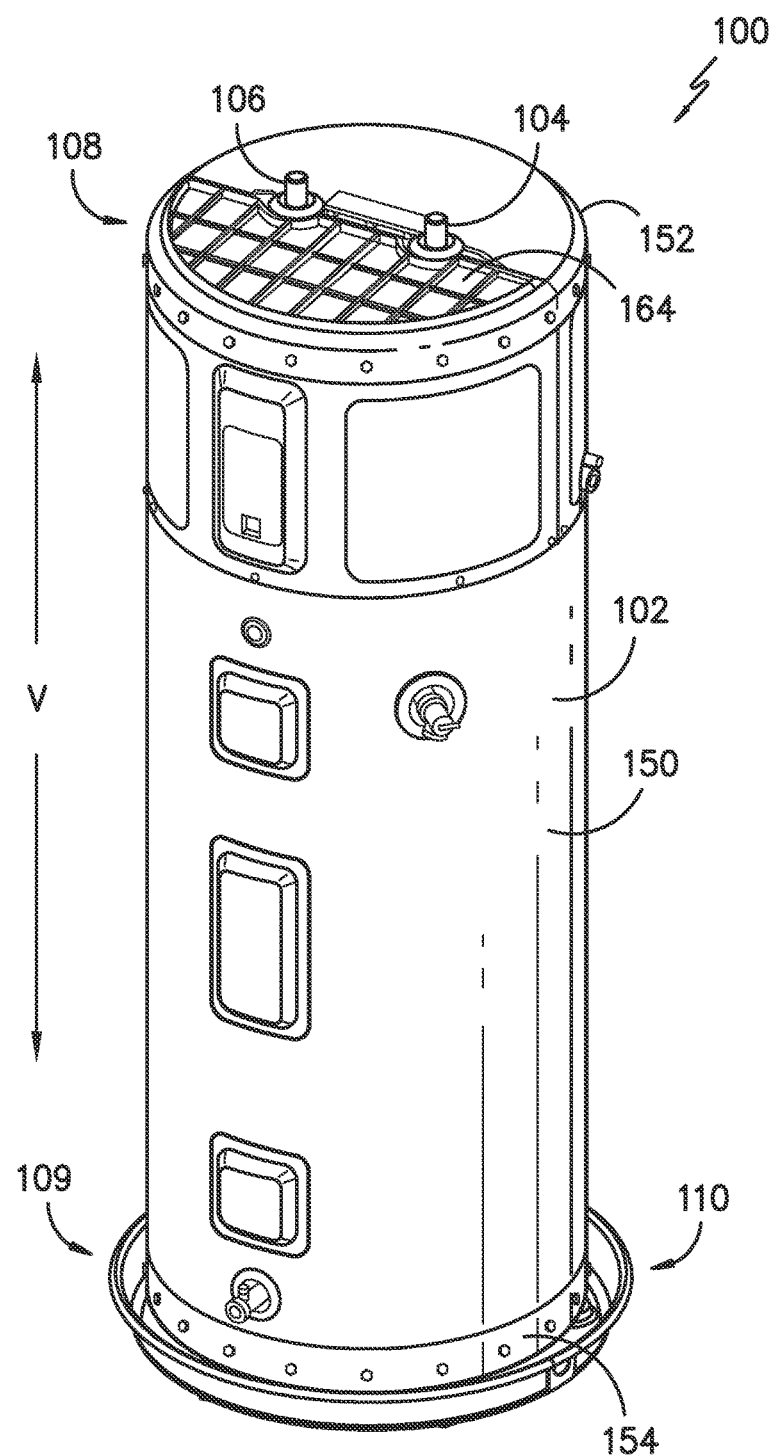
FIG. -1-

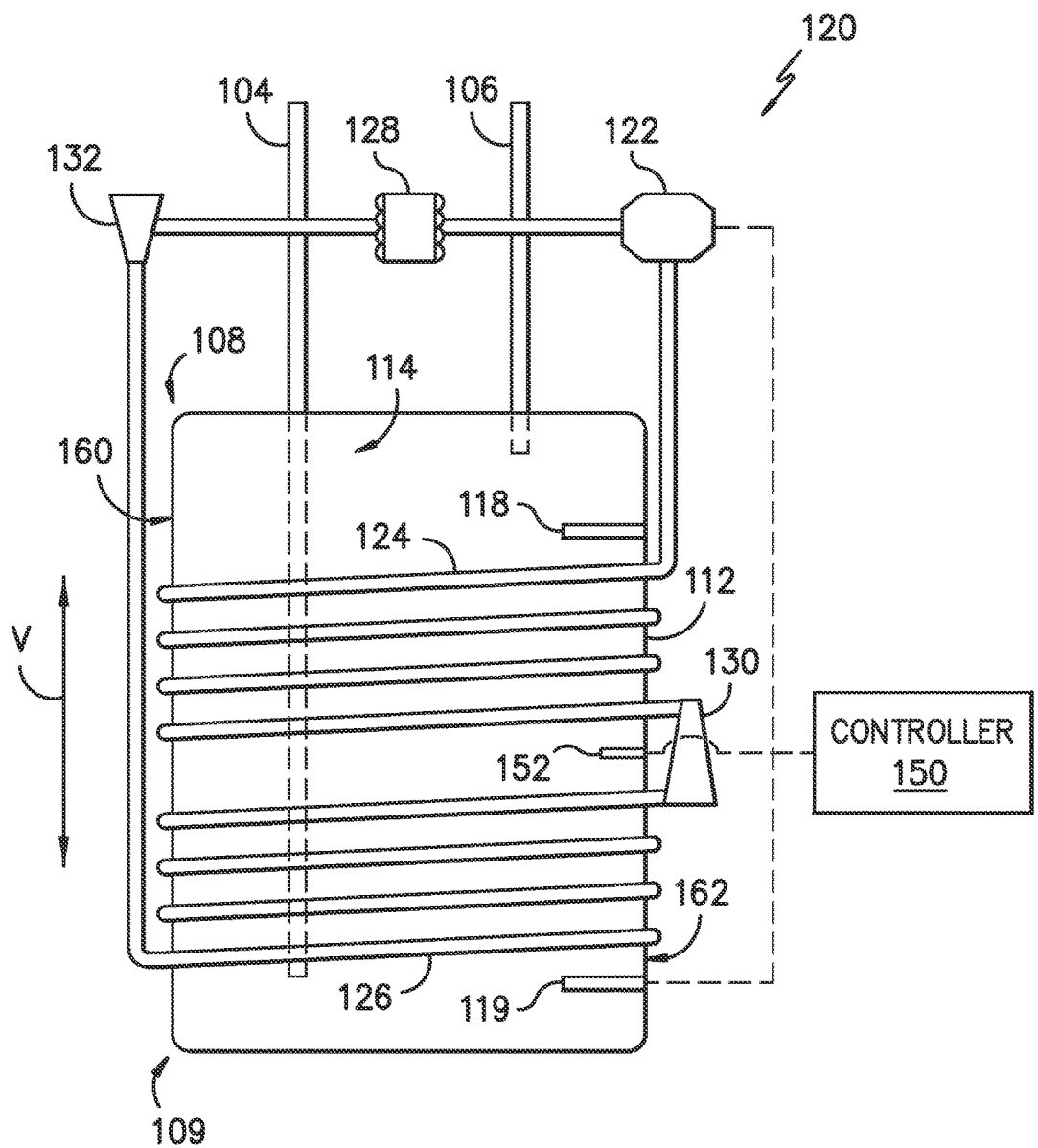
FIG. -2-

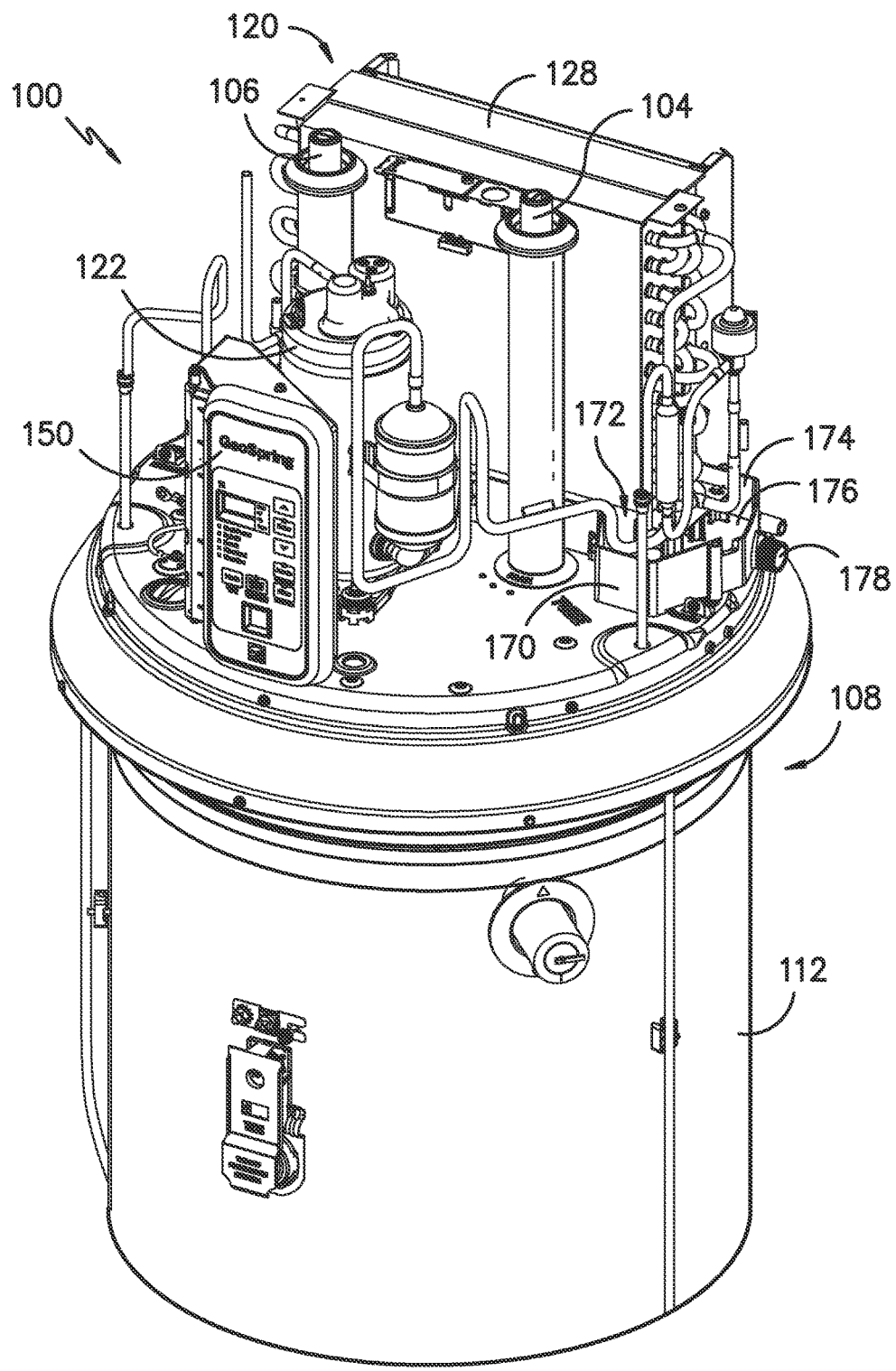
FIG. -3-

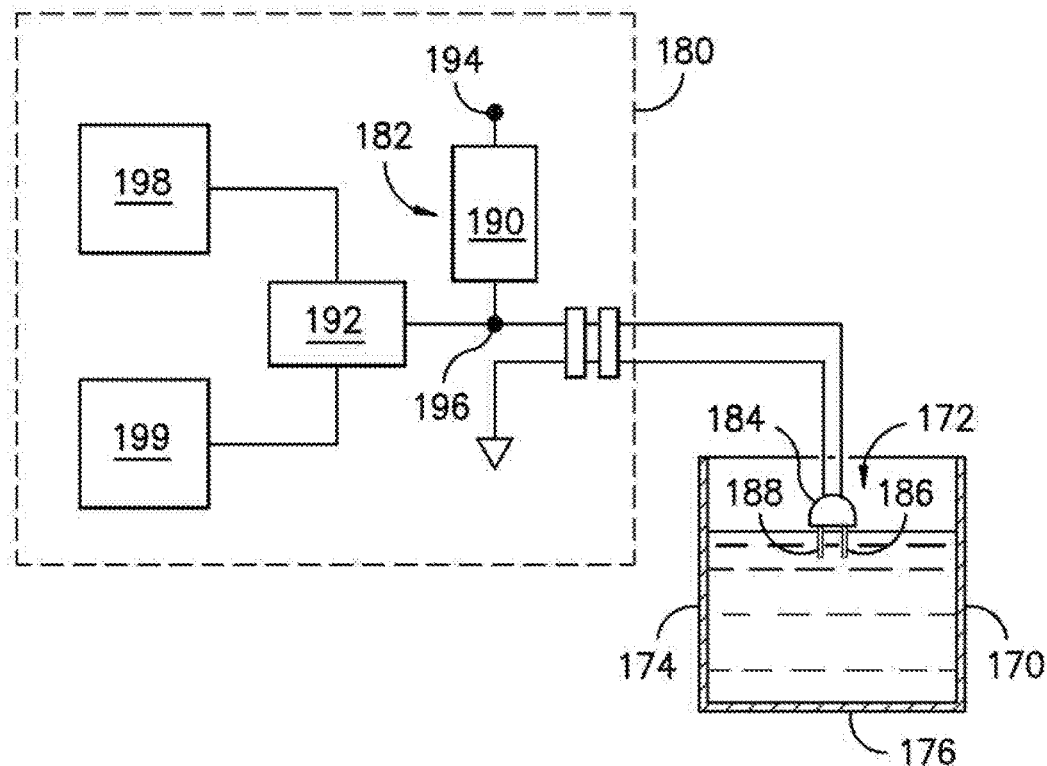
FIG. -4-
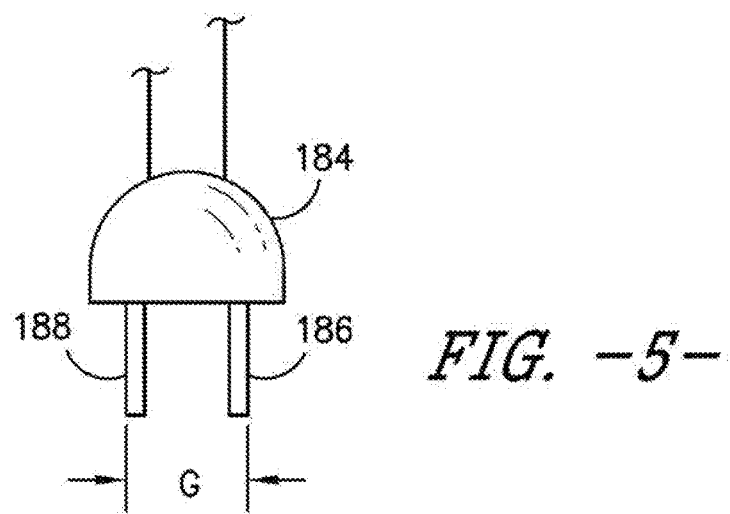
FIG. -5-

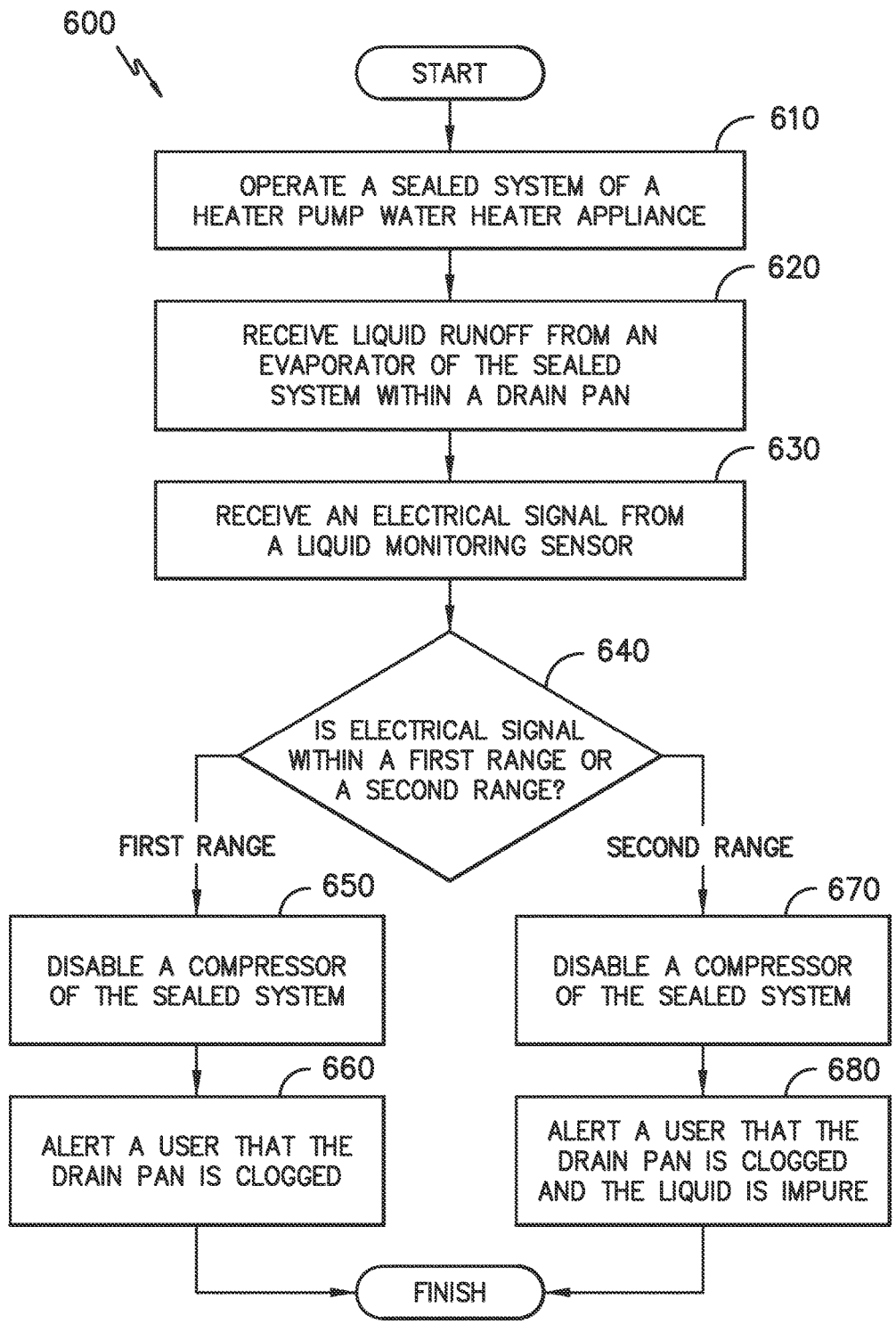
FIG. -6-

HEAT PUMP WATER HEATER APPLIANCE AND A METHOD FOR OPERATING THE SAME

FIELD OF THE INVENTION

The present subject matter relates generally to heat pump water heater appliances.

BACKGROUND OF THE INVENTION

Heat pump water heaters are gaining broader acceptance as a more economic and ecologically-friendly alternative to electric water heaters. Heat pump water heaters include a sealed system for heating water to a set temperature. The sealed system generally includes a condenser configured in a heat exchange relationship with a water storage tank within the water heater appliance and an evaporator.

During operation of the sealed system, water vapor can condense or desublimate on the evaporator and form a frost buildup over time. The frost buildup can negatively affect performance of the sealed system. To remove the frost buildup from the evaporator, heat pump water heater appliances are generally configured for performing a defrost cycle periodically. As an example, certain heat pump water heater appliances include heating elements mounted to the evaporator that are activated during the defrost cycle to melt the frost buildup. As the frost buildup melts, liquid runoff is generated.

Collecting the liquid runoff formed during the defrost cycle and directing the liquid runoff away from the evaporator can be difficult. For example, drain lines and drain pans can clog. In particular, dust, vermin, insects and other debris can clog a drain line out of the drain pan. When the drain line is clogged, the drain line can overflow and negatively affect operation and/or a cosmetic appearance of the heat pump water heater.

Accordingly, a heat pump water heater appliance with features for monitoring a drain pan of the heat pump water heater appliance in order to detect clogging of the drain pan would be useful. In addition, a method for identifying a type of liquid within a drain pan of a heat pump water heater appliance would be useful.

BRIEF DESCRIPTION OF THE INVENTION

The present subject matter provides a heat pump water heater appliance with a tank that defines an interior volume. A drain pan is positioned below an evaporator of a sealed system. A liquid monitoring sensor has a voltage divider with a pair of probes. The probes of the pair of probes extend into the drain pan. A related method for operating a heat pump water heater appliance is also provided. Additional aspects and advantages of the invention will be set forth in part in the following description, or may be apparent from the description, or may be learned through practice of the invention.

In a first exemplary embodiment, a heat pump water heater appliance is provided. The heat pump water heater appliance includes a tank that defines an interior volume. A sealed system is configured for heating water within the interior volume of the tank. The sealed system has an evaporator. A drain pan is positioned below the evaporator of the sealed system. The drain pan is positioned for receiving liquid runoff from the evaporator of the sealed system. A liquid monitoring sensor has a voltage divider with a pair of probes. The probes of the pair of probes extend into the drain pan. A controller is in electrical communication with the liquid monitoring sensor such that the controller is configured for receiving an electrical signal from the liquid monitoring sensor.

In a second exemplary embodiment, a method for operating a heat pump water heater appliance is provided. The method includes operating a sealed system of the heat pump water heater appliance in order to heat water within a tank of the heat pump water heater appliance, receiving liquid runoff from an evaporator of the sealed system within a drain pan of the heat pump water heater appliance, receiving an electrical signal from a liquid monitoring sensor of the heat pump water heater appliance at a controller of the heat pump water heater appliance, and establishing that liquid within the drain pan is substantially pure liquid water if the electrical signal from the liquid monitoring sensor is within a first range or that liquid within the drain pan includes contaminated liquid water if the electrical signal from the liquid monitoring sensor is within a second range.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a water heater appliance according to an exemplary embodiment of the present subject matter.

FIG. 2 provides a schematic view of certain components of the exemplary water heater appliance of FIG. 1.

FIG. 3 provides a partial perspective view of certain components of the exemplary water heater appliance of FIG. 1.

FIG. 4 provides a schematic view of a liquid monitoring sensor of the exemplary water heater appliance of FIG. 1.

FIG. 5 provides a schematic view of a pair of probes of the liquid monitoring sensor of FIG. 4.

FIG. 6 illustrates a method for operating a heat pump water heater appliance according to an exemplary embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a water heater appliance 100 according to an exemplary embodiment of the present subject matter. Water heater appliance 100 includes an outer shell or casing 102. Casing 102 generally surrounds a tank 112 (FIG. 2) such that tank 112 is disposed within casing 102. Casing 102 may be formed from a variety of components. As illustrated, casing 102 may include a wrapper 154 and one or more covers, such as a top cover 156 and a bottom cover 158 as illustrated. Covers 156, 158 may be fastened or coupled to wrapper 154 to form casing 102.

Upper and lower heating elements 118, 119 (FIG. 2) and a sealed system 120 (FIG. 2) may also be positioned within casing 102 for heating water within tank 112. Upper and lower heating elements 118, 119 can be any suitable heating elements. For example, upper heating element 118 and/or lower heating element 119 may be an electric resistance element, a microwave element, an induction element, or any other suitable heating element or combination thereof. Lower heating element 119 may also be a gas burner. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water heater appliance 100 also includes an inlet or cold water conduit 104 and an outlet or hot water conduit 106 that are both in fluid communication with a chamber or interior volume 114 (FIG. 2) defined by tank 112. As an example, cold water from a water source, e.g., a municipal water supply or a well, can enter water heater appliance 100 through cold water conduit 104. From cold water conduit 104, such cold water can enter interior volume 114 of tank 112 wherein it is heated with heating elements 118, 119 and/or sealed system 120 to generate heated water. Such heated water can exit water heater appliance 100 at hot water conduit 106 and, e.g., be supplied to a bath, shower, sink, or any other suitable feature.

Water heater appliance 100 extends longitudinally between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator 128 (FIG. 2) of water heater appliance 100. It should be understood that water heater appliance 100 is provided by way of example only and that the present subject matter may be used with any suitable water heater appliance, including for example a heat pump water heater appliance.

FIG. 2 provides a schematic view of certain components of water heater appliance 100. As may be seen in FIG. 2, water heater appliance 100 may include sealed system 120 for heating water within interior volume 114 of tank 112. Sealed system 120 generally operates in a heat pump cycle. Thus, water heater appliance 100 is commonly referred to as a "heat pump water heater appliance." Water heater appliance 100 may additionally include one or more auxiliary heating elements, such as upper heating element 118 and/or lower heating element 119.

Sealed system 120 may include a compressor 122, a first condenser 124, a second condenser 126 and an evaporator 128. Compressor 122 and/or evaporator 128 of sealed system 120 may be disposed within casing 102 at top portion 108 of water heater appliance 100. As is generally understood, various conduits may be utilized to flow refrigerant between the various components of sealed system 120. Thus, e.g., evaporator 128 may be between and in fluid communication with second condenser 126 and compressor 122. During operation of sealed system 120, refrigerant may flow from evaporator 128 through compressor 122. For example, refrigerant may exit evaporator 128 as a fluid in the form of a superheated vapor and/or high quality vapor mixture. Upon exiting evaporator 128, the refrigerant may enter compressor 122. Compressor 122 may be operable to compress the refrigerant. Accordingly, the pressure and temperature of the refrigerant may be increased in compressor 122 such that the refrigerant becomes a superheated vapor.

Each condenser 124, 126 may be assembled in a heat exchange relationship with tank 112 in order to heat water within interior volume 114 of tank 112 during operation of sealed system 120. First condenser 124 may be positioned downstream of and in fluid communication with compressor 122, and may be operable to heat the water within interior volume 114 using energy from the refrigerant. For example, the superheated vapor from compressor 122 may enter first condenser 124 wherein it transfers energy to the water within tank 112 and condenses into a saturated liquid and/or liquid vapor mixture. Second condenser 126 may be positioned downstream of and in fluid communication with first condenser 124, and may additionally be operable to heat the water within interior volume 114 using energy from the refrigerant, such as by further condensing the refrigerant.

Sealed system 120 may also include a first throttling device 130 between first condenser 124 and second condenser 126, and/or a second throttling device 132 between second condenser 126 and evaporator 128. Refrigerant, which may be in the form saturated liquid vapor mixture, may exit first condenser 124 and travel through first throttling device 130 before flowing through second condenser 126. First throttling device 130 may generally expand the refrigerant, lowering the pressure and temperature thereof. The refrigerant may then be flowed through second condenser 126. Similarly, refrigerant, which may be in the form of high quality/saturated liquid vapor mixture, may exit second condenser 126 and travel through second throttling device 132 before flowing through evaporator 128. Second throttling device 132 may generally expand the refrigerant, lowering the pressure and temperature thereof. The refrigerant may then be flowed through evaporator 128.

First and second throttling devices 130, 132 may be any suitable components for generally expanding the refrigerant. For example, in some exemplary embodiments, first and second throttling device 130, 132 may be a Joule-Thomson expansion valve, also known as a "J-T valve." In other exemplary embodiments, first and second throttling device 130, 132 may be an ejector. In still other exemplary embodiments, a capillary tube, fixed orifice, or other suitable apparatus may be utilized as first and second throttling device 130, 132.

Water heater appliance 100 may additionally include a temperature sensor 152. Temperature sensor 152 may be configured for measuring a temperature of water within interior volume 114 of tank 112. Temperature sensor 152 can be positioned at any suitable location within water heater appliance 100. For example, temperature sensor 152 may be positioned within interior volume 114 of tank 112 or may be mounted to tank 112 outside of interior volume 114 of tank 112. Temperature sensor 152 may further be positioned within upper portion 160 or lower portion 162. When mounted to tank 112 outside of interior volume 114 of tank 112, temperature sensor 152 can be configured for indirectly measuring the temperature of water within interior volume 114 of tank 112. For example, temperature sensor 152 can measure the temperature of tank 112 and correlate the temperature of tank 112 to the temperature of water within interior volume 114 of tank 112. Temperature sensor 152 may be any suitable temperature sensor. For example, temperature sensor 152 may be a thermocouple or a thermistor.

Water heater appliance 100 may further include a controller 150 that regulates operation of water heater appliance 100. Controller 150 may be, for example, in operative communication with sealed system 120 (such as compressor 122, and/or other components thereof), auxiliary heating elements, and/or temperature sensor 152. Thus, controller 150 can selectively activate system 120 and/or auxiliary heating elements in order to heat water within interior volume 114 of tank 112.

Controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

FIG. 3 provides a partial perspective view of certain components of water heater appliance 100. As may be seen in FIG. 3, water heater appliance 100 includes a drain pan 170. Drain pan 170 is positioned below evaporator 128 of sealed system 120. In particular, drain pan 170 is positioned for receiving liquid runoff from evaporator 128 of sealed system 120. Thus, during a defrost cycle of sealed system 120, frost buildup on evaporator 128 may melt, and liquid runoff may flow to and collect within drain pan 170. Drain pan 170 may be positioned within casing 102. In particular, both evaporator 128 and drain pan 170 may be disposed within the casing 102, e.g., at or adjacent top portion 108 of casing 102.

Drain pan 170 defines a collection volume 172 for receiving and collecting liquid runoff from evaporator 128. Collection volume 172 may be positioned directly below at least a portion of evaporator 128. Drain pan 170 includes a side wall 174 and a bottom wall 176 that assist with defining collection volume 172. Side wall 174 is mounted to and extends about bottom wall 176. Side wall 174 also extends upwardly from bottom wall 176. Side wall 174 or bottom wall 176 may include a drain line coupling 178. Drain line coupling 178 is configured for engaging a drain line (not shown), such as a pipe or hose. The drain line may receive liquid from collection volume 172 of drain pan 170 and direct the liquid out of and away from drain pan 170. Drain line coupling 178 may be threaded in order to assist with mounting the drain line to drain line coupling 178. As another example, the drain line may be adhered or fastened to drain line coupling 178.

FIG. 4 provides a schematic view of a liquid monitoring sensor 180 of water heater appliance 100. Liquid monitoring sensor 180 is configured for and includes features to detect when a height of liquid within collection volume 172 of drain pan 170 exceeds a threshold height and/or when liquid within collection volume 172 of drain pan 170 is contaminated or impure. Liquid monitoring sensor 180 is discussed in greater detail below.

As may be seen in FIG. 4, liquid monitoring sensor 180 includes a voltage divider 182 with a pair of probes 184. Probes 184 are positioned within and/or extend into collection volume 172 of drain pan 170. Voltage divider 182 also includes at least two electrical impedance elements. In particular, voltage divider 182 may include a first electrical impedance element 190 and a second electrical impedance element 192. Controller 150 is in electrical communication with liquid monitoring sensor 180, e.g., voltage divider 182 of liquid monitoring sensor 180. Thus, controller 150 is configured for receiving an electrical signal from liquid monitoring sensor 180, e.g., voltage divider 182 of liquid monitoring sensor 180.

As may be seen in FIG. 4, probes 184 include a first probe 188 and a second probe 186. In certain exemplary embodiments, first probe 188 is grounded, and second probe 186 is electrically coupled to first and second electrical impedance elements 190, 192. First and second electrical impedance elements 190, 192 may be any suitable combination of electrical impedance elements. For example, first and second electrical impedance elements 190, 192 may each be one of a resistor, a capacitor and an inductor. In certain exemplary embodiments, first electrical impedance element 190 may be a resistor, and second electrical impedance element 192 may be a capacitor.

First electrical impedance element 190 extends between an input voltage pin 194 and a connection conductor 196 of voltage divider 182. Input voltage pin 194 may be electrically coupled to a suitable power supply, such as a direct current (DC) power supply. As an example, input voltage pin 194 may be electrically coupled to a battery, an AC/DC adapter, etc. Connection conductor 196 of voltage divider 182 also extends between and electrically couples first electrical impedance element 190, second electrical impedance element 192 and second probe 186 together, e.g., such that at least one terminal of first electrical impedance element 190, second electrical impedance element 192 and second probe 186 are at a common voltage. Second electrical impedance element 192 extends between an analog or digital input pin 198 of controller 150 and connection conductor 196. Thus, controller 150 may receive the electrical signal from voltage divider 182 at analog or digital input pin 198 of controller 150. A voltmeter 199 of controller 150 may assist with determining the strength (e.g., magnitude) of the electrical signal from voltage divider 182.

FIG. 5 provides a schematic view of probes 184 of liquid monitoring sensor 180. As may be seen in FIG. 5, probes 184 are spaced apart from each other, e.g., by a gap G, within collection volume 172 of drain pan 170. The size of the gap G may be selected in order to assist with determining whether substantially pure water or contaminated water is disposed within collection volume 172 of drain pan 170. As used herein the term "contaminated water" means a liquid solution or mixture that includes liquid water and a substantial amount (e.g., at least one percent by weight) of at least one of dust and refrigerant and the term "substantially pure water" means a liquid solution or mixture that includes liquid water and negligible (e.g., less than one percent by weight) dust and refrigerant. The gap G may be sized such that the resistance across probes 184 is a first resistance when the liquid between probes 184 is substantially pure water and is a second (different) resistance when the liquid between probes 184 is contaminated water. The difference between the first and second resistances may assist with determining whether liquid within collection volume 172 of drain pan 170 is contaminated water or substantially pure water, as discussed in greater detail below.

FIG. 6 illustrates a method 600 for operating a heat pump water heater appliance according to an exemplary embodiment of the present subject matter. Method 600 may be used to operate any suitable heat pump water heater appliance. For example, method 600 may be used to operate water heater appliance 100 (FIG. 1). Controller 150 may be programmed and/or configured to implement certain portions of method 600. Utilizing method 600, controller 150 may determine or establish when a height of liquid within collection volume 172 of drain pan 170 exceeds a threshold height and/or when liquid within collection volume 172 of drain pan 170 is contaminated or impure.

At step 610, sealed system 120 of water heater appliance 100 is operated in order to heat water within tank 112. As an example, controller 150 may activate compressor 122 of sealed system 120 in order to operate sealed system 120 and heat water within tank 112 at step 610. At step 620, liquid runoff from evaporator 128 is received within and/or directed to drain pan 170. For example, during a defrost cycle of sealed system 120, controller 150 may deactivate sealed system 120 by turning off compressor 122 and active a heating element on evaporator 128 in order to melt ice on evaporator 128. Liquid runoff from the melting ice may be directed to and received within drain pan 170 at step 620.

When the drain line from drain pan 170 is clogged and drain pan 170 begins to fill with the liquid, the liquid eventually contacts and extends between probes 184 of liquid monitoring sensor 180. At step 630, controller 150 receives an electrical signal from liquid monitoring sensor 180, e.g., when the drain line from drain pan 170 is clogged and drain pan 170 is filled with liquid such that a height of liquid within collection volume 172 of drain pan 170 exceeds a threshold height. The voltage and/or current of the electrical signal from liquid monitoring sensor 180 may correspond to the resistance across probes 184 provided by the liquid within drain pan 170 from step 620. As discussed above, the resistance across probes 184 varies depending upon the composition of the liquid within drain pan 170. Thus, at step 640, controller 150 determines whether the electrical signal (e.g., a voltage or current of the electrical signal) from liquid monitoring sensor 180 is within a first range or a second range.

If the electrical signal from liquid monitoring sensor 180 is within the first range at step 640, it may be established that liquid within drain pan 170 is substantially pure water, e.g., due to the resistance across probes 184 being the first resistance when the liquid between probes 184 is substantially pure water. At step 650, controller 150 deactivates compressor 122 in order to disable sealed system 120 and limit the amount of additional liquid runoff directing into drain pan 170 if the electrical signal is within the first range at step 640. In addition, at step 660, controller 150 alerts a user of water heater appliance 100 that drain pan 170 is clogged if the electrical signal is within the first range at step 640. As an example, controller 150 may send a text message, instant message, or e-mail to the user of water heater appliance 100 at step 660. As another example, controller 150 may activate an audio speaker to provide an audible alert or a visual display (such as an LED, light bulb, LCD display, etc.) in order to provide a visual alert to the user of water heater appliance 100 at step 660.

If the electrical signal from liquid monitoring sensor 180 is within the second range at step 640, it may be established that liquid within drain pan 170 is contaminated or impure water, e.g., due to the resistance across probes 184 being the second resistance when the liquid between probes 184 is contaminated or impure water. At step 670, controller 150 deactivates compressor 122 in order to disable sealed system 120 and limit the amount of additional liquid runoff directing into drain pan 170 if the electrical signal is within the second range at step 640. In addition, at step 680, controller 150 alerts a user of water heater appliance 100 that drain pan 170 is clogged, e.g., in the same or similar manner to step 660 described above, if the electrical signal is within the second range at step 640. At step 680, controller 150 may also alert the user of water heater appliance 100 that an air filter 164 (FIG. 1) of water heater appliance 100 is saturated or clogged if the electrical signal from liquid monitoring sensor 180 is within the second range at step 640. As an example, dust within liquid in drain pan 170 may contaminate the water and change the resistance across probes 184 to the second resistance. Thus, air filter 164 may need to be changed when the electrical signal from liquid monitoring sensor 180 is within the second range at step 640. At step 680, controller 150 may also alert the user of water heater appliance 100 that sealed system 120 is leaking refrigerant if the electrical signal from liquid monitoring sensor 180 is within the second range at step 640. As an example, refrigerant within liquid in drain pan 170 may contaminate the water and change the resistance across probes 184 to the second resistance. Thus, sealed system 120 may need to be serviced when the electrical signal from liquid monitoring sensor 180 is within the second range at step 640. Controller 150 and/or the user of water heater appliance 100 may request a service call for water heater appliance 100 if the electrical signal from liquid monitoring sensor 180 is within the second range at step 640.

In such a manner, method 600 may assist with determining or establishing when a height of liquid within collection volume 172 of drain pan 170 exceeds a threshold height and/or when liquid within collection volume 172 of drain pan 170 is contaminated or impure. Method 600 may provide an economical method for informing the user of performance of water heater appliance 100. In addition, method 600 may assist with limiting or preventing property damage associated with clogging of drain pan 170 and/or leaking of sealed system 120.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat pump water heater appliance, comprising:
   a tank defining an interior volume;
   a sealed system configured for heating water within the interior volume of the tank, the sealed system having an evaporator;
   a drain pan positioned below the evaporator of the sealed system, the drain pan positioned for receiving liquid runoff from the evaporator of the sealed system;
   a liquid monitoring sensor having a voltage divider with a pair of probes, the probes of the pair of probes extending into the drain pan; and a controller in electrical communication with the liquid monitoring sensor such that the controller is configured for receiving an electrical signal from the liquid monitoring sensor, wherein the controller is configured for:
  establishing that liquid within the drain pan is substantially pure liquid water having less than one percent of dust or refrigerant if the electrical signal from the liquid monitoring sensor is within a first voltage range,
  determining that liquid within the drain pan includes contaminated liquid water having at least one percent of dust or refrigerant if the electrical signal from the liquid monitoring sensor is within a second voltage range, and
  disabling a compressor of the sealed system if the electrical signal from the liquid is within the second voltage range.

2. The heat pump water heater appliance of claim 1, wherein a first probe of the pair of probes is grounded.

3. The heat pump water heater appliance of claim 2, wherein a second probe of the pair of probes is electrically coupled to a first electrical impedance element and a second electrical impedance element of the voltage divider, the first and second electrical impedance elements each being one of a resistor, a capacitor and an inductor.

4. The heat pump water heater appliance of claim 3, wherein the first electrical impedance element is a resistor and the second electrical impedance element is a capacitor.

5. The heat pump water heater appliance of claim 3, wherein the first electrical impedance element extends between an input voltage pin and a connection conductor of the voltage divider, the connection conductor of the voltage divider extending between and electrically coupling the first electrical impedance element, the second electrical impedance element and the second probe of the pair of probes, the second electrical impedance element extending between an analog or digital input pin of the controller and the connection conductor.

6. The heat pump water heater appliance of claim 5, wherein the first electrical impedance element is a resistor and the second electrical impedance element is a capacitor.

7. The heat pump water heater appliance of claim 1, wherein the probes of the pair of probes are spaced apart from each other by a gap within the drain pan.

8. The heat pump water heater appliance of claim 1, wherein the controller is configured for alerting a user of the water heater appliance if the electrical signal from the liquid monitoring sensor exceeds a threshold voltage.

9. The heat pump water heater appliance of claim 1, further comprising a casing, the tank disposed within the casing, the evaporator of the sealed system and the drain pan also disposed within the casing.

10. The heat pump water heater appliance of claim 9, wherein the casing extends between a top portion and a bottom portion, the evaporator of the sealed system and the drain pan disposed within the casing adjacent the top portion of the casing.

11. The heat pump water heater appliance of claim 1, further comprising a drain line extending from the drain pan, the drain line configured for directing liquids out of the drain pan.

12. A heat pump water heater appliance, comprising:
a tank defining an interior volume;
a sealed system configured for heating water within the interior volume of the tank, the sealed system having an evaporator;
a drain pan positioned below the evaporator of the sealed system, the drain pan positioned for receiving liquid runoff from the evaporator of the sealed system;
a liquid monitoring sensor having a voltage divider with a pair of probes, the probes of the pair of probes extending into the drain pan; and
a controller in electrical communication with the liquid monitoring sensor such that the controller is configured for receiving an electrical signal from the liquid monitoring sensor, wherein the controller is configured for:
  establishing that liquid within the drain pan is substantially pure liquid water having less than one percent of dust or refrigerant if the electrical signal from the liquid monitoring sensor is within a first voltage range,
  determining that liquid within the drain pan includes contaminated liquid water having at least one percent of dust or refrigerant if the electrical signal from the liquid monitoring sensor is within a second voltage range, and
  activating an audible alert speaker or a visual display if the electrical signal from the liquid is within the second voltage range.

13. The heat pump water heater appliance of claim 12, wherein a first probe of the pair of probes is grounded, and wherein the probes of the pair of probes are spaced apart from each other by a gap within the drain pan.

14. The heat pump water heater appliance of claim 13, wherein a second probe of the pair of probes is electrically coupled to a first electrical impedance element and a second electrical impedance element of the voltage divider, the first and second electrical impedance elements each being one of a resistor, a capacitor and an inductor.

15. The heat pump water heater appliance of claim 14, wherein the first electrical impedance element is a resistor and the second electrical impedance element is a capacitor.

16. The heat pump water heater appliance of claim 14, wherein the first electrical impedance element extends between an input voltage pin and a connection conductor of the voltage divider, the connection conductor of the voltage divider extending between and electrically coupling the first electrical impedance element, the second electrical impedance element and the second probe of the pair of probes, the second electrical impedance element extending between an analog or digital input pin of the controller and the connection conductor.

17. The heat pump water heater appliance of claim 16, wherein the first electrical impedance element is a resistor and the second electrical impedance element is a capacitor.

18. The heat pump water heater appliance of claim 12, further comprising a casing, the tank disposed within the casing, the evaporator of the sealed system and the drain pan also disposed within the casing.

19. The heat pump water heater appliance of claim 18, wherein the casing extends between a top portion and a bottom portion, the evaporator of the sealed system and the drain pan disposed within the casing adjacent the top portion of the casing.

20. The heat pump water heater appliance of claim 12, further comprising a drain line extending from the drain pan, the drain line configured for directing liquids out of the drain pan.

* * * * *